United States Patent
Koseki et al.

(10) Patent No.: US 9,998,627 B2
(45) Date of Patent: Jun. 12, 2018

(54) IMAGE READING DEVICE, IMAGE FORMING APPARATUS, AND METHOD OF SETTING WHITE REFERENCE VALUE

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Naoya Koseki, Shizuoka (JP); Yusuke Hashizume, Chiba (JP)

(73) Assignees: KABUSHII KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/619,797

(22) Filed: Jun. 12, 2017

(65) Prior Publication Data

US 2017/0280015 A1    Sep. 28, 2017

Related U.S. Application Data

(63) Continuation of application No. 14/719,979, filed on May 22, 2015, now Pat. No. 9,699,353.

(51) Int. Cl.
*H04N 1/401* (2006.01)
*H04N 1/12* (2006.01)
(Continued)

(52) U.S. Cl.
CPC ......... *H04N 1/401* (2013.01); *H04N 1/00045* (2013.01); *H04N 1/02815* (2013.01);
(Continued)

(58) Field of Classification Search
CPC ............... H04N 1/401; H04N 1/00045; H04N 1/02815; H04N 1/125; H04N 1/129
(Continued)

(56) References Cited

U.S. PATENT DOCUMENTS 5,125,047 A * 6/1992 Ito ........................... H04N 1/03
355/68
5,673,126 A    9/1997 Ando
(Continued)

FOREIGN PATENT DOCUMENTS

JP    2014-135585    7/2014

OTHER PUBLICATIONS

Non-Final Office Action for U.S. Appl. No. 14/719,979 dated May 9, 2016, 23 Pages.
(Continued)

*Primary Examiner* — Jamares Q Washington
(74) *Attorney, Agent, or Firm* — Amin, Turocy & Watson LLP (57) ABSTRACT

According to an embodiment, an image reading device includes a photoelectric conversion unit, a white reference plate, a rotation unit, and a control unit. The photoelectric conversion unit includes an image reading sensor which converts light from an imaging position into image data. The white reference plate has a reading range which is a white reference value. The rotation unit rotates the photoelectric conversion unit so as to come to an angle at which a plurality of portions in the reading range of the white reference plate become imaging positions. The control unit sets a white reference value using a plurality of pixels on the white reference plate which are read using the photoelectric conversion unit which is rotated using the rotation unit.

9 Claims, 9 Drawing Sheets

(51) Int. Cl.
*H04N 1/00* (2006.01)
*H04N 1/028* (2006.01)

(52) U.S. Cl.
CPC ............ *H04N 1/124* (2013.01); *H04N 1/125* (2013.01); *H04N 1/129* (2013.01); *H04N 1/1275* (2013.01); *H04N 2201/0081* (2013.01)

(58) Field of Classification Search
USPC .................. 358/3.26, 1.9, 1.13, 504, 516
See application file for complete search history.

(56) References Cited

U.S. PATENT DOCUMENTS

| | | | |
|---|---|---|---|
| 6,020,967 A | 2/2000 | Gregorio et al. | |
| 6,721,465 B1 | 4/2004 | Nakashima et al. | |
| 2003/0016398 A1* | 1/2003 | Soeda | H04N 1/401 358/461 |
| 2013/0094043 A1* | 4/2013 | Ikari | H04N 1/02815 358/1.13 |

OTHER PUBLICATIONS

Final Office Action for U.S. Appl. No. 14/719,979 dated Oct. 18, 2016, 21 Pages.

\* cited by examiner

IMAGE READING DEVICE, IMAGE FORMING APPARATUS, AND METHOD OF SETTING WHITE REFERENCE VALUE

CROSS-REFERENCE TO RELATED APPLICATIONS

This application is a Continuation of application Ser. No. 14/719,979 filed May 22, 2015, the entire contents of which are incorporated herein by reference.

FIELD

Embodiments described herein relate generally to an image reading device, an image forming apparatus, and a setting method of a white reference value.

BACKGROUND

In the related art, an image reading device corrects a reading signal using reference values of a white level and a black level. For example, the image reading device creates a reference value of a white level by reading a white reference plate. However, the image reading device in which a position of a reading unit is fixed can perform reading of a reference plate which is provided at a fixed position only at a fixed reading position. An accuracy of a reference value of a white level which is created using a result of reading the reference plate only at a fixed position deteriorates due to an influence of dirt which adheres to the reference plate.

For this reason, in the image reading device in the related art, a mechanism for moving a reading position of a reading unit in the sub-scanning direction is necessary in order to read a white reference plate by a plurality of pixels.

DETAILED DESCRIPTION

An object of the exemplary embodiment is to provide an image reading device in which it is possible to stably set a white reference value, an image forming apparatus, and a method of setting the white reference value.

According to an embodiment, an image reading device includes a photoelectric conversion unit, a white reference plate, a rotation unit, and a control unit. The photoelectric conversion unit includes an image reading sensor which converts light from an imaging position into image data. The white reference plate has a reading range which is a white reference value. The rotation unit rotates the photoelectric conversion unit so as to come to an angle at which a plurality of portions in the reading range of the white reference plate become imaging positions. The control unit sets a white reference value using a plurality of pixels of the white reference plate which are read using the photoelectric conversion unit which is rotated using the rotation unit.

Hereinafter, embodiments will be described with reference to drawings.

Figure 1:
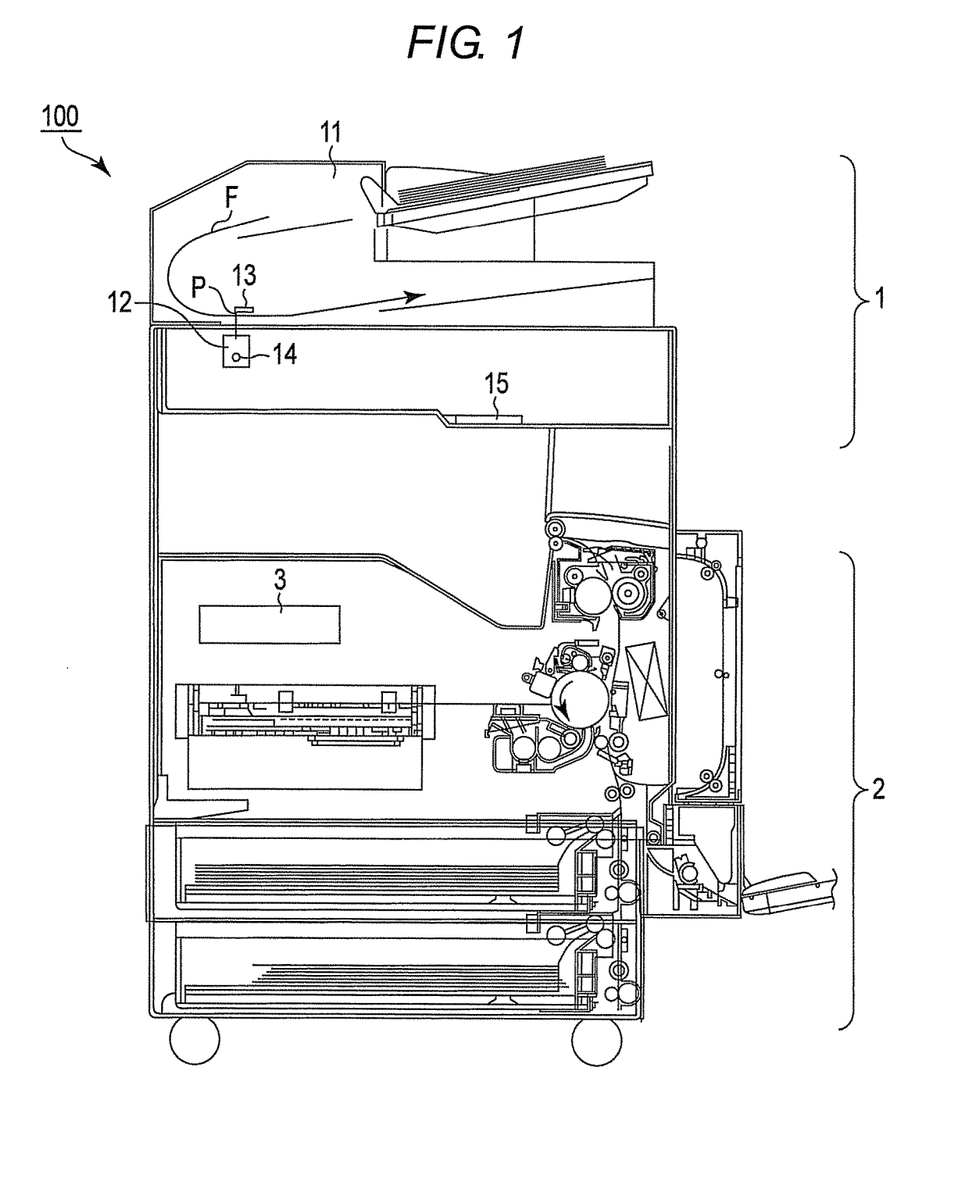
FIG. 1 is a cross-sectional view which illustrates a configuration example of a digital multifunction peripheral according to an embodiment.

FIG. 1 is a diagram which illustrates a configuration example of a digital multifunction peripheral (MFP) 100 as an image reading device and an image forming apparatus according to the embodiment. The MFP 100 includes an image reading unit (scanner) 1 as the image reading device, and an image forming unit (printer) 2.

The image reading unit 1 converts an image of the original document into image data. The image reading unit 1 reads image information of the original document in each line in a pixel unit corresponding to a resolution, and generates image data. The image reading unit 1 includes an auto document feeder (ADF) 11, a photoelectric conversion unit 12, a white reference plate 13, a rotation unit 14, a scanner control unit 15, and the like.

The ADF 11 transports the original document. The ADF 11 picks up the original documents which are placed on an original document table one by one. In the example illustrated in FIG. 1, the ADF 11 transports the picked up original document along a transport direction F. The ADF 11 transports the original document so that a reading face of the original document passes through an image reading position P of the photoelectric conversion unit 12 on the transport path of the original document.

The photoelectric conversion unit 12 performs a conversion into image data by imaging an imaging position. For example, the photoelectric conversion unit 12 converts an image of the original document which passes through the image reading position P into image data. The white reference plate 13 is a plate which becomes a white reference in an image reading process. The rotation unit 14 rotates the photoelectric conversion unit. The scanner control unit 15 controls the image reading unit 1. In addition, a configuration of the image reading unit 1 will be described later in detail.

The image forming unit 2 forms an image on a recording medium such as a sheet based on image data. For example, the image forming unit 2 forms an image on a recording medium based on image data which is read from the original document using the image reading unit 1. In addition, the image forming unit 2 forms an image on a recording medium based on image data which is received from an external device. An image forming method of the image forming unit 2 of the MFP 100 is not limited. For example, the image forming unit 2 may be configured of a printer of an electrophotographic method, an ink jet method, a heat transfer method, or the like. In addition, the image forming unit 2 may be a monochrome printer, or a color printer. In addition, the image forming unit 2 may be a unit which forms an image using a special image forming material such as a decolorable image forming material.

In addition, the MFP 100 includes a main control unit 3. The main control unit 3 generally controls the entire MFP 100. The main control unit 3 is connected to the scanner control unit 15 of the image reading unit 1, a printer control unit of the image forming unit 2, and the like. The main control unit 3 controls the image reading unit 1 and the image forming unit 2. In addition, the main control unit 3 also has a communication function, or the like, with an external device. A configuration of the main control unit 3 will be described later.

Figure 2:
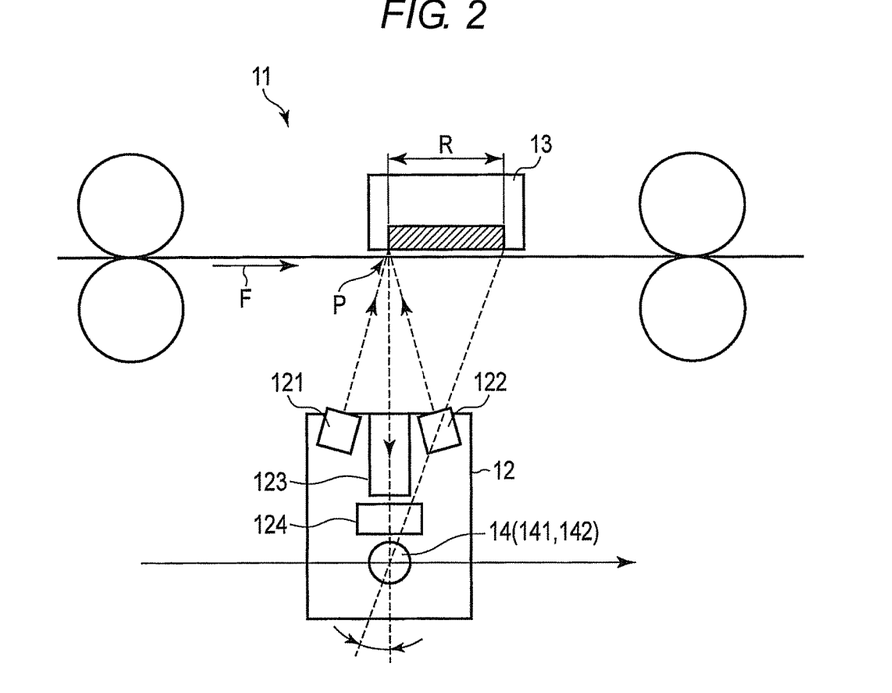
FIG. 2 is a diagram which illustrates a configuration example of an image reading unit according to the embodiment.

FIG. 2 is a diagram which illustrates a configuration example of the image reading unit 1 of the MFP 100 according to the embodiment.

The photoelectric conversion unit 12 includes a first lighting unit 121, a second lighting unit 122, an optical system 123, and an imaging unit 124.

The first lighting unit 121 and the second lighting unit 122 are light sources which illuminate the image reading position P. For example, the first lighting unit 121 includes a light guiding tube of a white type including three LEDs of a red LED, a green LED, and a blue LED as light sources. The first lighting unit 121 illuminates a face of the original document in a direction of being inclined to the face of the original document which passes through the image reading position by a predetermined angle. The second lighting unit 122 is configured of an LED array which includes a yellowish green LED as a light source. The second lighting unit 122 radiates light with different spectral properties from those of the first lighting unit 121. The second lighting unit 122 illuminates a face of the original document from a direction of being approximately symmetrical to the first lighting unit 121 with respect to a normal line of the face of the original document which passes through the image reading position P. In addition, a configuration of illuminating the image reading position is not limited to the configurations of the above described first lighting unit 121 and the second lighting unit 122.

The optical system 123 is configured of a lens, or the like. The optical system 123 guides reflected light from the image reading position which is illuminated using the first lighting unit 121 and the second lighting unit 122 to the imaging unit 124. The optical system 123 guides light which is radiated from the first lighting unit 121 and the second lighting unit 122, and is reflected on the face of the original document to an image forming position of the imaging unit 124.

The imaging unit 124 reads an image on the original document using an image reading sensor. As the image reading sensor of the imaging unit 124, for example, a line sensor in which photoelectric conversion elements are aligned in the main scanning direction is used. That is, the imaging unit 124 images a light image which is formed at the image forming position. The imaging unit 124 converts light which is radiated to the image forming position into an image signal. The imaging unit 124 is configured of, for example, a line sensor in which photoelectric conversion elements (imaging elements) such as a CCD, and a photodiode are aligned in the main scanning direction. The imaging unit 124 outputs image data of the original document which is obtained using the image reading sensor.

The rotation unit 14 includes a shaft 141 and a rotation mechanism 142. The shaft 141 is fixed to the photoelectric conversion unit 12. The rotation mechanism 142 includes a gear, or the like, which rotates the shaft 141 using a driving motor and power of the driving motor. The rotation mechanism 142 rotates the shaft 141. The rotation mechanism 142 rotates the photoelectric conversion unit 12 which is fixed to the shaft 141 by rotating the shaft. The rotation mechanism 142 rotates the shaft 141 at every predetermined angle. The rotation mechanism 142 may be a mechanism which rotates the shaft 141 by an angle in a predetermined range. The angle in a predetermined range is an angle in which an imaging position of the photoelectric conversion unit 12 which rotates along with the shaft 141 becomes a reading range R of the white reference plate 13.

In addition, when reading an image of the original document which is transported by the ADF 11, the rotation unit 14 sets the photoelectric conversion unit 12 so that the imaging unit 124 reads the image reading position P. In addition, when reading the reading range R of the white reference plate 13, the rotation unit 14 rotates the photoelectric conversion unit 12 so that the imaging unit 124 reads the reading range R. For example, when reading the reading range R of the white reference plate 13 at every predetermined interval, the rotation unit 14 rotates the photoelectric conversion unit 12 by a predetermined angle.

The white reference plate 13 is a reference plate for setting a white reference value which is used in shading correction. The white reference plate 13 may be provided so that the photoelectric conversion unit 12 which is rotated using the rotation unit 14 can read the reading range R. In the configuration example illustrated in FIG. 2, the white reference plate 13 is set so that an end portion of the reading range R becomes the image reading position P.

Figure 3:
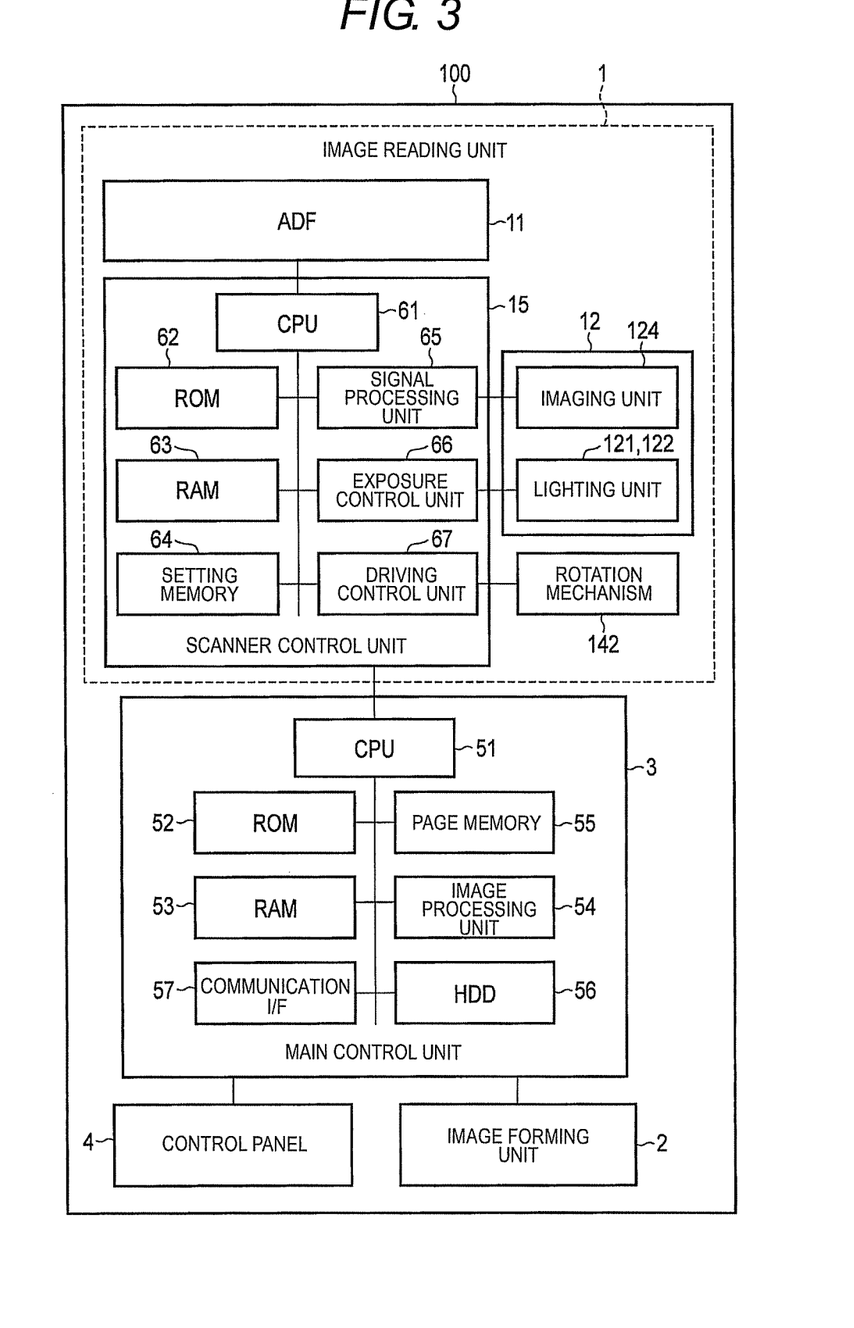
FIG. 3 is a block diagram which illustrates a configuration example of a control system in the digital multifunction peripheral according to the embodiment.

FIG. 3 is a block diagram which illustrates a configuration example of a control system of the MFP 100 according to the embodiment.

As illustrated in FIG. 3, the MFP 100 includes a control panel 4, or the like, in addition to the image reading unit 1, the image forming unit 2, and the main control unit 3.

The main control unit 3 includes a CPU 51, a ROM 52, a RAM 53, an image processing unit 54, a page memory 55, a hard disk drive (HDD) 56, a communication interface (I/F) 57, and the like.

The CPU 51 controls the entire main control unit 3. The ROM 52 is a non-volatile memory. For example, a control program or control data is stored in the ROM 52. The ROM 52 may be a rewritable non-volatile memory. The RAM 53 is a volatile memory. The RAM 53 functions as a working memory. For example, various parameters, working data, or the like, is stored in the RAM 53.

The image processing unit 54 is a unit for performing image processing with respect to image data. The page memory 55 is a memory which develops image data for image forming. The HDD 56 is a large quantity memory which stores image data, or the like. The communication interface 57 is an interface for performing a data communication with an external device through a network, or the like.

The control system of the image reading unit 1 includes the ADF 11, the photoelectric conversion unit 12, the rotation unit 14, the scanner control unit 15, or the like. As illustrated in FIG. 3, the scanner control unit 15 includes a CPU 61, a ROM 62, a RAM 63, a setting memory 64, a signal processing unit 65, an exposure control unit 66, a driving control unit 67, or the like.

The CPU 61 controls the entire image reading unit 1. The RAM 63 is configured of a volatile memory, or the like. The ROM 62 is configured of a non-volatile memory. The ROM 62 stores a control program which is executed using the CPU 61, control data, or the like. In addition, the setting memory 64 is configured of a rewritable non-volatile memory. The setting memory 64 stores a white reference value, a black reference value, or the like. In addition, the setting memory 64 stores a setting value of a rotation angle (adjusting angle) of the photoelectric conversion unit 12 corresponding to a read pixel of the white reference plate 13. In addition, the setting memory 64 may store a setting value, for example, how many pixels (how many lines) of the white reference plate 13 will be read, in a setting process of a white reference value (reading process of white reference plate).

The signal processing unit 65 processes an output signal (image data) from the image reading sensor of the imaging unit 124 of the photoelectric conversion unit 12. The signal processing unit 65 has a processing function of, for example, an analog-digital conversion, shading correction, image correction, or the like. The analog-digital conversion is a process in which an output signal (analog signal) from the image reading sensor of the imaging unit 124 is converted into a digital signal. The shading correction is a process in which image data which is obtained by reading a face of the original document using the image reading sensor of the imaging unit 124 is corrected based on a white reference value and a black reference value. In addition, the white reference value and the black reference value which are used in the shading correction may be stored in a memory which is provided in the signal processing unit 65.

The exposure control unit 66 controls light emitting of the lighting unit (first lighting unit 121 and second lighting unit 122). For example, the exposure control unit 66 controls ON-OFF of the first lighting unit 121 and the second lighting unit 122 according to an instruction from the CPU 61. In addition, the exposure control unit 66 also has a function of controlling a light intensity of light which is emitted from the lighting unit (first lighting unit 121 and second lighting unit 122).

The driving control unit 67 controls driving of the rotation mechanism 142 of the rotation unit 14. That is, the photoelectric conversion unit 12 which is fixed to the shaft 141 is rotated (inclined) using the driving control unit 67, and the rotation mechanism 142. The driving control unit 67 rotates the photoelectric conversion unit 12 by driving the rotation mechanism 142 in order to read a plurality of pixels in the reading range R of the white reference plate 13. For example, the driving control unit 67 rotates the photoelectric conversion unit 12 at an angle (adjusting angle) corresponding to a read pixel on the white reference plate 13 using the rotation mechanism 142. In addition, a setting value such as a rotation angle (adjusting angle) of the photoelectric conversion unit 12 corresponding to a read pixel of the white reference plate 13 may be stored in a memory which is provided in the driving control unit 67.

In addition, the image forming unit 2 forms an image on a recording medium such as a sheet. The image forming unit 2 controls an image forming process using the printer control unit. For example, the printer control unit of the image forming unit 2 forms an image on a recording medium according to image data which is supplied from the main control unit 3. The image forming unit 2 is not limited to a specific image forming method.

The control panel 4 is a user interface to which various operation instructions are input. The control panel 4 supplies an input operation instruction to the main control unit 3. The control panel 4 may include a display unit which displays a guide, or the like. For example, the control panel 4 includes a liquid crystal display device in which a touch panel is built, hard keys such as a numeric keypad, or the like.

Subsequently, an example of a copying operation as an operation example of the MFP 100 which is configured as described above will be schematically described.

First, it is assumed that a user performs an input of a copying instruction in the control panel 4. When receiving the copying instruction from the control panel 4, the CPU 51 of the main control unit 3 outputs a reading instruction of an original document image to the scanner control unit 15 of the image reading unit 1.

The scanner control unit 15 reads the white reference plate 13 using the photoelectric conversion unit 12. The scanner control unit 15 sets a white reference value based on a read result of the white reference plate 13. In addition, the scanner control unit 15 sets a black reference value based on an output signal of the imaging unit 124 in a state in which lighting is turned off. After setting the white reference value and the black reference value, the scanner control unit 15 feeds the original document using the ADF 11. The scanner control unit 15 reads an image of the original document which is transported by the ADF 11 using the photoelectric conversion unit 12. The scanner control unit 15 performs signal processing with respect to image data (read data) which is obtained by scanning a face of the original document using the photoelectric conversion unit 12, using the signal processing unit 65. For example, the signal processing unit 65 performs shading correction with respect to the read data based on the white reference value and the black reference value. The scanner control unit 15 supplies the read data which is subjected to the signal processing to the main control unit 3 as image data of the original document.

The main control unit 3 converts the image data which is supplied from the image reading unit 1 into data with a format for image forming, using the image processing unit 54. When the image data of the original document which is read in the image reading unit 1 is converted into data with a format for image forming, the main control unit 3 supplies the image data to the image forming unit 2. The image forming unit 2 forms an image according to the image data which is supplied from the main control unit 3 on a recording medium. For example, the image forming unit 2 forms the image on a sheet using an electro-photographic method.

Subsequently, a reading process of the white reference plate 13 in the image reading unit 1 will be described.

Figure 4:
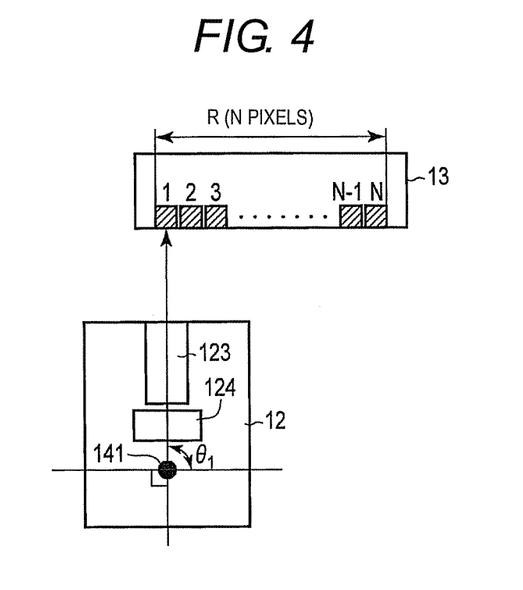
FIG. 4 is a diagram which illustrates a relationship between a photoelectric conversion unit and read pixels on a white reference plate in the image reading unit according to the embodiment.
Figure 5:
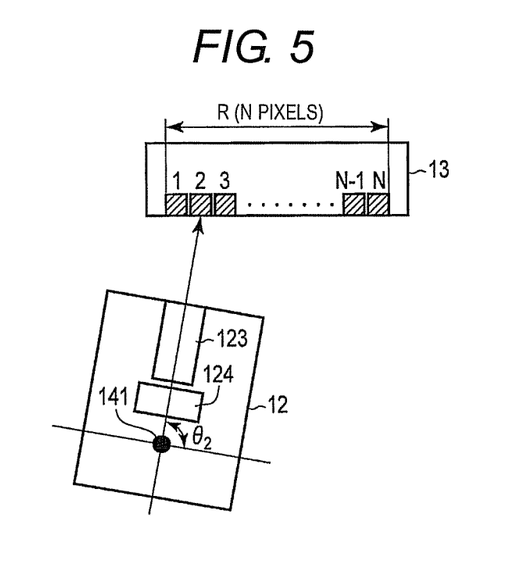
FIG. 5 is a diagram which illustrates a relationship between the photoelectric conversion unit in the image reading unit and read pixels on the white reference plate according to the embodiment.

FIGS. 4 and 5 are diagrams which illustrate a relationship between the photoelectric conversion unit 12 and each read pixel in the reading range R on the white reference plate 13.

In the examples in FIGS. 4 and 5, it is assumed that the white reference plate 13 is present at a reading position of N pixels (N lines) in the reading range R.

FIG. 4 is an example in which an imaging position of the photoelectric conversion unit 12 is set to a pixel at an end portion (first pixel) in the reading range R of the white reference plate 13. In the example illustrated in FIG. 4, an adjusting angle of the photoelectric conversion unit 12 for reading the first pixel of the white reference plate 13 is θ1. In addition, in the example illustrated in FIG. 4, an imaging direction of the photoelectric conversion unit 12 is perpendicular to a reading face of the white reference plate 13. That is, in the example illustrated in FIG. 4, when reading the first pixel of the white reference plate 13, the adjusting angle θ1 of the photoelectric conversion unit 12 is 90 degrees.

In addition, FIG. 5 is an example in which the imaging position of the photoelectric conversion unit 12 is set to the second pixel in the reading range R of the white reference plate 13. In the example illustrated in FIG. 5, when reading the second pixel of the white reference plate 13, an adjusting angle of the photoelectric conversion unit 12 becomes θ2.

In addition, it is assumed that adjusting angles of the photoelectric conversion unit 12 when reading the third pixel, . . . , the nth pixel become θ3, . . . , θn in the reading range R of the white reference plate 13.

As illustrated in FIGS. 4 and 5, when setting the adjusting angle, the adjusting angles θ1, . . . , θn become θ1 (=90 degrees)>θ2>θ3> . . . >θn.

The adjusting angles θ1 to θn of the photoelectric conversion unit 12 are set so as to correspond to each read pixel (1 to n) in the reading range R of the white reference plate 13. That is, in the image reading unit 1, an installation position of the white reference plate 13 is fixed, and the photoelectric conversion unit 12 rotates by having the shaft 141 which is fixed as a fulcrum. For this reason, each adjusting angle θ1 to θn becomes a setting value which can be set in advance. The setting memory 64 holds the adjusting angle (θ1 to θn) which is correlated with each pixel (1 to N) on the white reference plate 13. The scanner control unit 15 sets an adjusting angle corresponding to a read pixel on the white reference plate 13 based on the setting value which is stored in the setting memory 64.

In addition, when the white reference plate 13 is provided as illustrated in FIGS. 4 and 5, an optical path distance between the imaging unit 124 of the photoelectric conversion unit 12 and each read pixel of the white reference plate 13 is not constant. When there is a change in optical path distance between the imaging unit 124 and each read pixel of the white reference plate 13, an output from the image reading sensor of the imaging unit 124 also changes. In order to constantly maintain an output level of the image reading sensor, the exposure control unit 66 may adjust a light intensity of light which is emitted from the lighting unit (first lighting unit 121 and second lighting unit 122).

In the configuration examples illustrated in FIGS. 4 and 5, an optical path distance between the imaging unit 124 and each read pixel on the white reference plate 13 becomes long when a read pixel on the white reference plate 13 moves from the first pixel to the Nth pixel. When light intensities of light emitted from the lighting units 121 and 122 are constant, an output from the image reading sensor of the imaging unit 124 deteriorates due to a long optical path distance.

Figure 6:
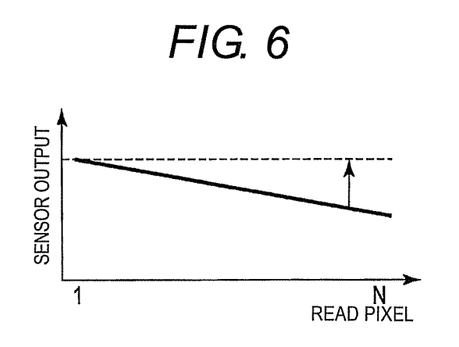
FIG. 6 is a diagram which illustrates an example of a relationship between each read pixel on the white reference plate and an output of an image reading sensor in the image reading unit according to the embodiment.
Figure 7:
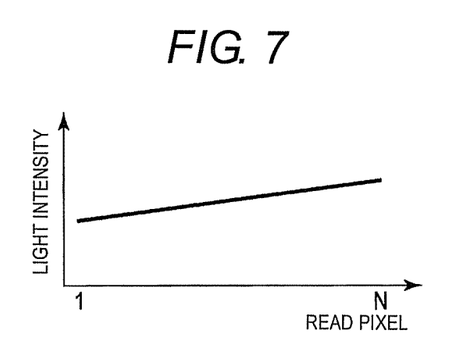
FIG. 7 is a diagram which illustrates an example of a relationship between each read pixel on the white reference plate and a light intensity in the image reading unit according to the embodiment.

FIG. 6 is a diagram which illustrates an example of a relationship between each read pixel on the white reference plate 13 and an output of the image reading sensor of the imaging unit 124. FIG. 7 is a diagram which illustrates an example of a relationship between each read pixel on the white reference plate 13 and a light intensity. In addition, in FIGS. 6 and 7, it is assumed that light intensities which are emitted from the first lighting unit 121 and the second lighting unit 122 are constant.

In order to constantly maintain an output level of the image reading sensor illustrated in FIG. 6, the image reading unit 1 may control light intensities of light beams which are emitted from the lighting units 121 and 122 so that a light intensity illustrated in FIG. 7 becomes constant. For example, when the plurality of pixels of the white reference plate 13 are read in order from the first pixel, the scanner control unit 15 constantly maintains the output level of the image reading sensor by increasing the light intensities of the lighting units 121 and 122 in order. That is, the scanner control unit 15 stably executes a reading process of the white reference plate 13 by controlling light intensities of the lighting units 121 and 122 according to an adjusting angle of the photoelectric conversion unit 12.

Subsequently, a reading process of the original document image using the image reading unit 1 will be described.

Figure 8:
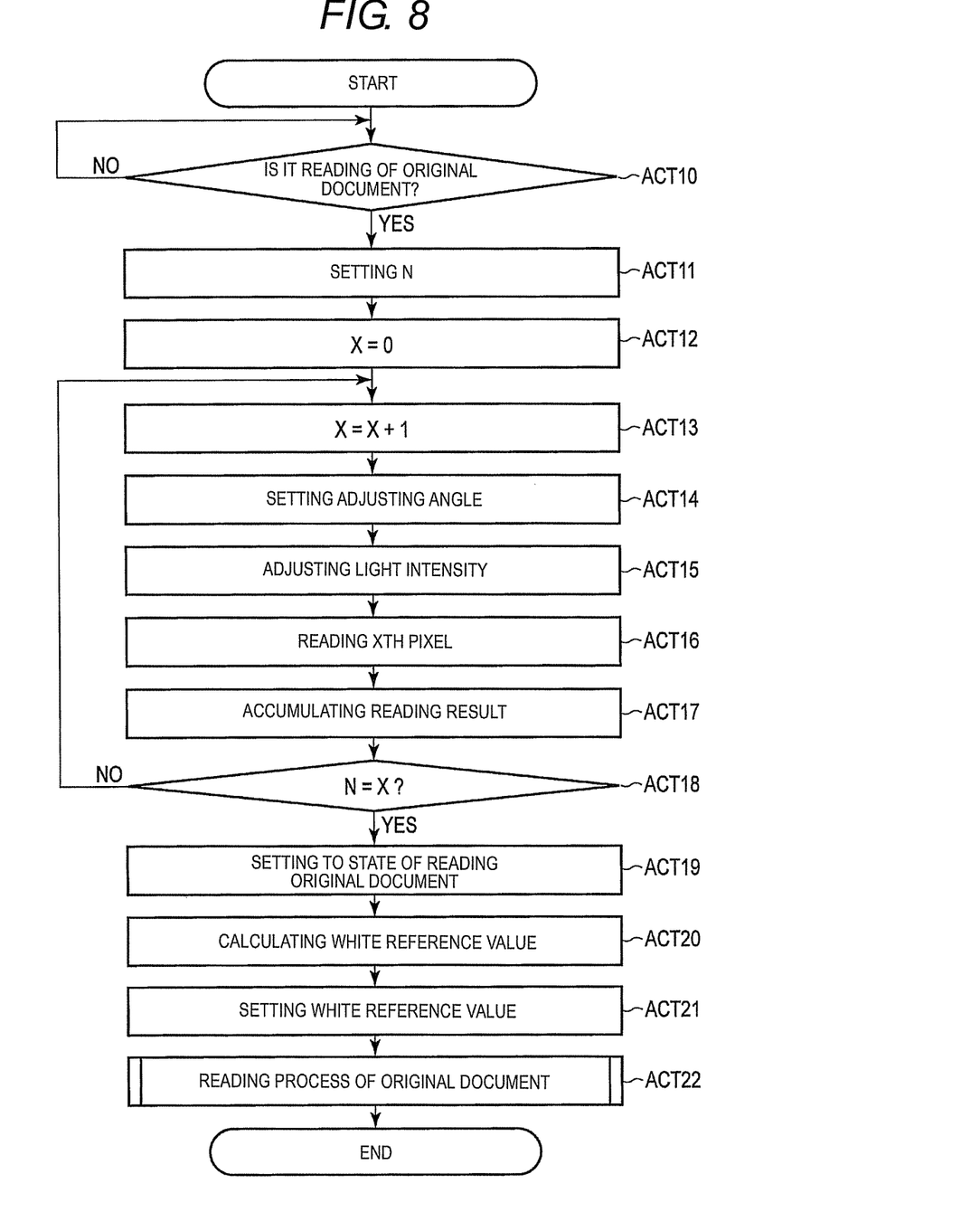
FIG. 8 is a flowchart for describing a flow of an image reading process including a setting process of a white reference value in the image reading unit according to the embodiment.

FIG. 8 is a flowchart for describing a flow of an image reading process including a setting process of a white reference value using the image reading unit 1.

When an instruction of reading the original document is input to the control panel 4, the main control unit 3 instructs the scanner control unit 15 to start a reading process of an original document image. The scanner control unit 15 starts a reading process of an original document image according to the instruction from the main control unit 3. When the reading process of the original document image is started (Yes in ACT 10), first, the CPU 61 of the scanner control unit 15 executes a setting process of a white reference value (ACTs 11 to 20). In addition, the scanner control unit 15 may execute a setting process of a black reference value before and after the setting process of the white reference value.

As the setting process of the white reference value, the CPU 61 of the scanner control unit 15 sets how many pixels (how many lines) of the reading range R of the white reference plate 13 will be read (ACT 11). In the example illustrated in FIG. 8, it is assumed that the CPU 61 of the scanner control unit 15 sets the number of read pixels of the white reference plate 13 to N. For example, when the number of read pixels N of the white reference plate 13 is set to 32, the CPU 61 reads images from the first pixel to the thirty second pixel of the reading range R as a process of the white reference plate. In addition, the number of read pixels N with respect to the white reference plate 13 may be set in advance, may be set according to an image reading mode, or may be instructed by a user.

When the number of read pixels N with respect to the white reference plate 13 is set, the CPU 61 initializes a variable X (ACT 12). For example, the CPU 61 sets X=0 as an initializing value of the variable X. When the variable X is initialized, the CPU 61 increments the variable X (X=X+1) (ACT 13). When the variable X is incremented, the CPU 61 sets Xth pixel in the reading range R of the white reference plate 13 to a read pixel.

When the Xth pixel of the white reference plate 13 is set to a read pixel, the CPU 61 determines an adjusting angle corresponding to the Xth pixel from a setting value which is stored in the setting memory 64. When the adjusting angle corresponding to the Xth pixel is determined, the CPU 61 drives the rotation unit 14 using the driving control unit 67, and sets an inclination of the photoelectric conversion unit 12 to an adjusting angle corresponding to the Xth pixel (ACT 14).

In addition, when the Xth pixel of the white reference plate 13 is set to a read pixel, the CPU 61 determines light intensities of the lighting units 121 and 122 corresponding to the Xth pixel from a setting value which is stored in the setting memory 64. When the light intensities corresponding to the Xth pixel are determined, the CPU 61 adjusts the light intensities of the lighting units 121 and 122 to light intensities corresponding to the Xth pixel using the exposure control unit 66 (ACT 15). The adjusting of the light intensity (ACT 15) may be performed parallel to ACT 14. In addition, the adjusting of the light intensity (ACT 15) may be omitted.

When setting of the adjusting angle and adjusting of the light intensity corresponding to the Xth pixel are completed, the CPU 61 executes reading of the Xth pixel of the white reference plate 13 using the imaging unit 124 of the photoelectric conversion unit 12 (ACT 16). The CPU 61 accumulates read data (signal output from imaging unit 124) of the Xth pixel of the white reference plate 13 in the RAM 63 (ACT 17). In addition, the read data of the Xth pixel of the white reference plate 13 may be accumulated in a buffer memory other than the RAM 63. When reading of the Xth pixel of the white reference plate 13 is completed, the CPU 61 determines whether or not the variable X reaches the number of read pixels N (ACT 18).

When the variable X does not reach the number of read pixels N, that is, when it is not X=N (No in ACT 18), the CPU 61 repeatedly executes processes in ACTS 13 to 18. In addition, when the variable X reaches the number of read pixels N, that is, when it is X=N (Yes in ACT 18), the CPU 61 ends the reading process of the white reference plate. When the reading process of the white reference plate is completed, the CPU 61 sets the photoelectric conversion unit 12 so as to be in a state of reading a face of the original document (ACT 19). For example, the CPU 61 sets an adjusting angle so that an imaging position of the photoelectric conversion unit 12 comes to a reading position of the face of the original document. In addition, the CPU 61 sets light intensities of the lighting units 121 and 122 to light intensities which are used when reading the face of the original document (ACT 19).

When the reading process of the white reference plate is completed, the CPU 61 calculates a white reference value using read data items of N pixels of the white reference plate 13 which are accumulated in the RAM 63 (ACT 20). For example, the CPU 61 calculates a mean value of read data items of the N pixels of the white reference plate 13 which are accumulated in the RAM 63 as a white reference value. However, a method of calculating the white reference value is not limited to a mean value of read data items of N pixels. When the white reference value is calculated, the CPU 61 sets the calculated white reference value to the setting memory 64 (ACT 20).

When the white reference value is set, the CPU 61 executes reading of a face of the original document (ACT 21). For example, the CPU 61 transports the original document using the ADF 11. When the original document is transported using the ADF 11, the CPU 61 images the face of the original document at a timing when the original document passes through the image reading position P, using the imaging unit 124 of the photoelectric conversion unit 12. The read data of the face of the original document which is imaged using the imaging unit 124 is processes by the signal processing unit 65. For example, the signal processing unit 65 performs a shading correction with respect to the read data of the original document image which is imaged using the imaging unit 124 based on the white reference value. The CPU 61 obtains the read data of the original document image which is processed by the signal processing unit 65 as image data of the original document.

As described above, the image reading unit according to the embodiment reads a plurality of pixels (plurality of lines) of the white reference plate by rotating the photoelectric conversion unit. The image reading unit creates a white reference value using a read result of the plurality of pixels (plurality of lines) of the white reference plate. As a result, in the image reading unit, it is possible to reduce an influence of a micro stain, or the like, which adheres to the white reference plate without being provided with a mechanism which moves the photoelectric conversion unit in the sub-scanning direction.

In addition, the image reading unit adjusts a light intensity according to a rotation of the photoelectric conversion unit. As a result, the image reading unit can obtain a stable read result of the white reference plate even when there is a change in optical path distance between the image reading sensor and each pixel of the white reference plate.

Subsequently, modification examples of the above described embodiment will be described.

The image reading unit 1 according to the embodiment reads a plurality of pixels of the white reference plate by rotating the photoelectric conversion unit 12. However, the white reference plate is not limited to the installation in which a face of the reading range R of the white reference plate 13 becomes parallel to the transport direction of the original document as illustrated in FIG. 3.

Figure 9:
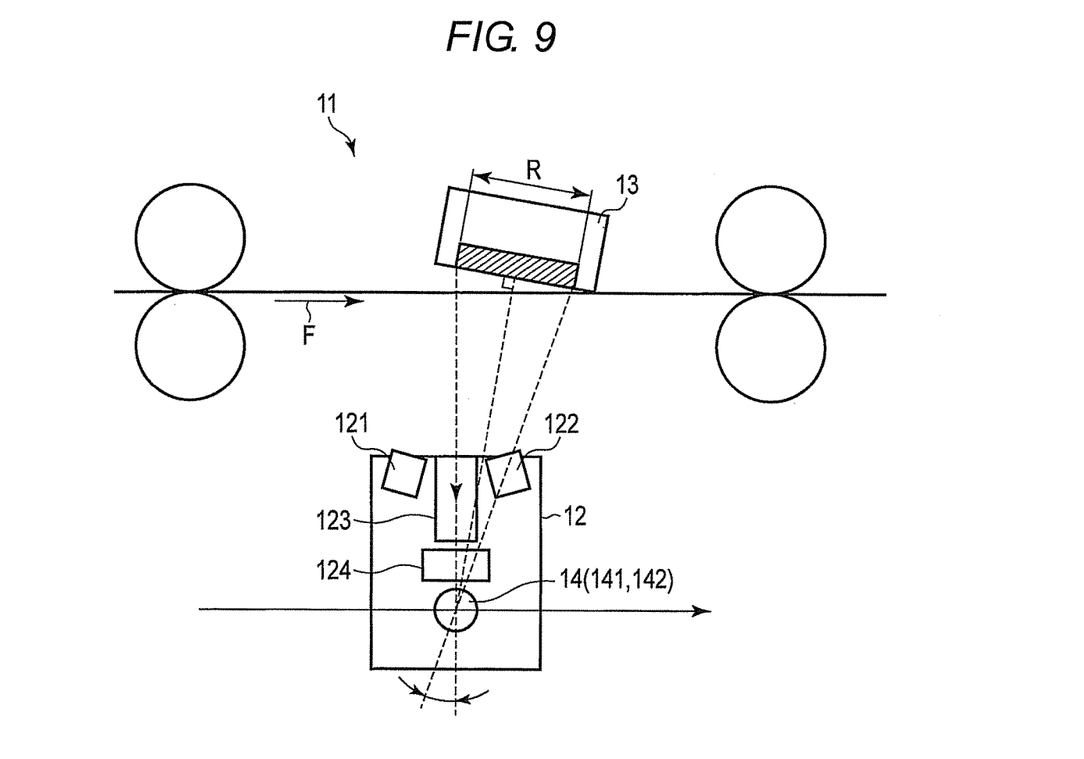
FIG. 9 is a diagram which illustrates a second installation example of the white reference plate in the image reading unit according to the embodiment.
Figure 10:
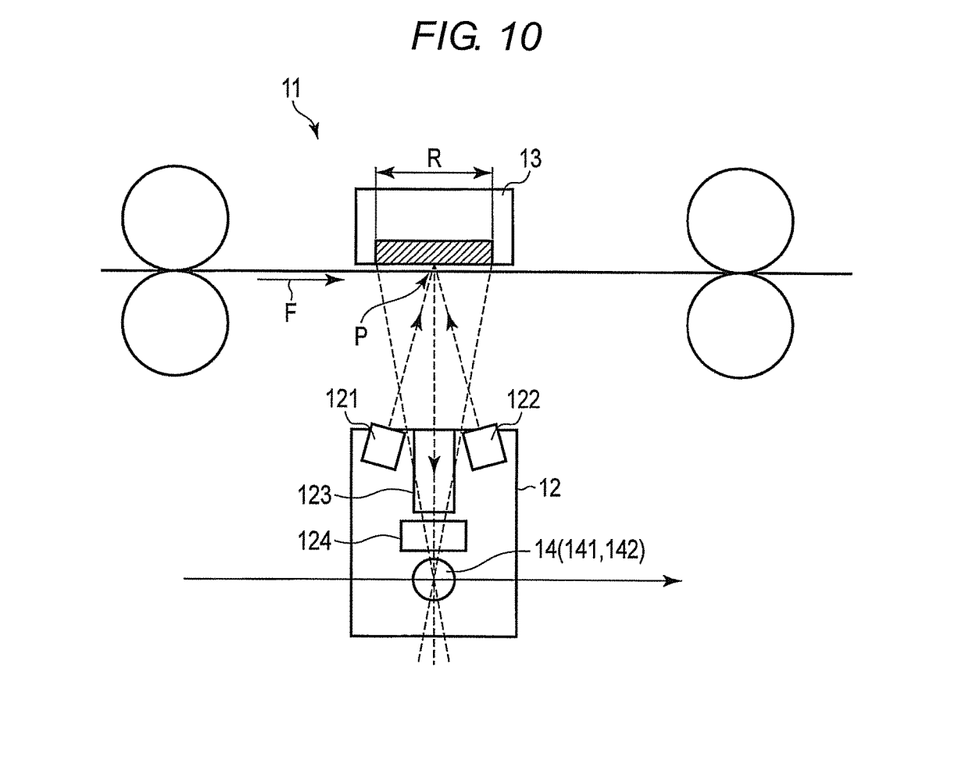
FIG. 10 is a diagram which illustrates a third installation example of the white reference plate in the image reading unit according to the embodiment.

FIGS. 9 and 10 are diagrams which illustrate other installation examples of the white reference plate 13.

FIG. 9 is a diagram which illustrates a second installation example of the white reference plate 13.

As illustrated in FIG. 9, a face of the reading range R of the white reference plate 13 may be installed by being inclined to the transport direction of the original document. FIG. 9 is an example in which an imaging direction of the photoelectric conversion unit 12 is set so as to be perpendicular to the face of the white reference plate 13 when reading an intermediate position in the reading range R of the white reference plate 13.

FIG. 10 is a diagram which illustrates a third installation example of the white reference plate 13.

FIG. 10 is an example in which an intermediate position in the reading range R of the white reference plate 13 is set so as to be the direction of the image reading position P. In addition, in the third installation example illustrated in FIG. 10, an adjusting angle of the photoelectric conversion unit 12 in a reading process of the white reference plate 13 is different from the examples illustrated in FIGS. 4 and 5.

According to the installation examples illustrated in FIGS. 9 and 10, there is a small change in optical path distance between the image reading sensor of the photoelectric conversion unit 12 and each pixel in the reading range R of the white reference plate 13, compared to the installation example illustrated in FIG. 3.

In addition, a shape of the reading range R of the white reference plate is also not limited to the configuration which is illustrated in FIG. 3.

Figure 11:
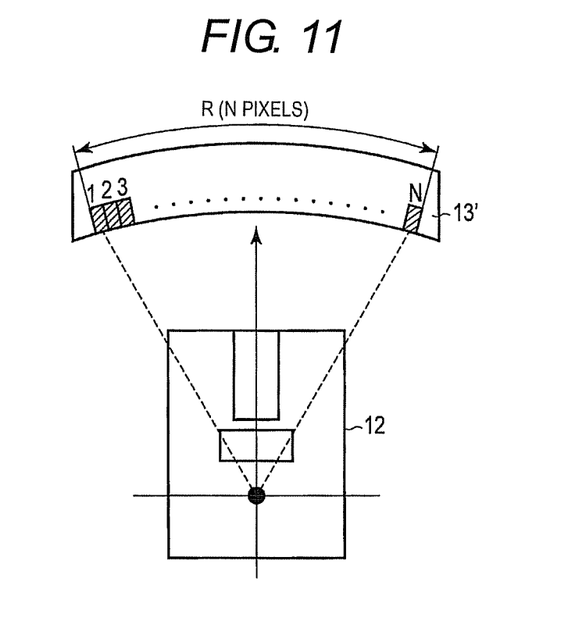
FIG. 11 is a diagram which illustrates another configuration example of the white reference plate in the image reading unit according to the embodiment.

FIG. 11 is a diagram which illustrates a configuration of a white reference plate 13' which has a shape different from that of the white reference plate 13 illustrated in FIG. 3.

In the white reference plate 13' which is illustrated in FIG. 11, a face of a reading range R which is read using the photoelectric conversion unit 12 has an arc shape. When the shape of the face of the reading range R of the white reference plate 13' has an arc shape, it is possible to make a change in optical path distance between the image reading sensor of the photoelectric conversion unit 12 and each read pixel of the white reference plate 13' small. For example, when a face of the reading range R is a circular arc shape in which the shaft 141 is centered, an optical path distance between the image reading sensor of the photoelectric conversion unit 12 and each read pixel of the white reference plate 13' becomes constant. When the optical path distance is constant, it is not necessary to adjust light intensities of the lighting units 121 and 122 according to an adjusting angle.

In addition, the shape of the white reference plate is not limited to the planar shape illustrated in FIG. 3 and the circular arc shape illustrated in FIG. 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image reading device comprising:
an image reading sensor which converts light from an imaging position into image data;
a lighting unit in which an imaging position is irradiated with light;
a white reference plate which has a reading range which is a white reference value;
a controller which adjusts a light intensity of light which is emitted from the lighting unit, and sets a white reference value using a plurality of pixels of the white reference plate which are read using the photoelectric conversion unit; and
a memory which stores each read pixel of the white reference plate and a light intensity in association with each other,
wherein the controller adjusts the light intensity based on information stored in the memory.

2. The device according to claim 1,
wherein the controller adjusts a light intensity based on a distance between a position of each read pixel on the white reference plate and the image reading sensor.

3. The device according to claim 2,
wherein the controller adjusts a light intensity so that a light exposure amount at a position of each read pixel on the white reference plate becomes constant.

4. The device according to claim 3,
wherein the controller increases a light intensity as a distance between the image reading sensor and a position of each read pixel on the white reference plate becomes long.

5. The device according to claim 2, further comprising:
a rotation unit which rotates the image reading sensor so as to come to an angle at which the plurality of portions in the reading range of the white reference plate become imaging positions; and
wherein the controller sets a white reference value using a plurality of pixels of the white reference plate which are read using the photoelectric conversion unit which is rotated using the rotation unit.

6. The device according to claim 1,
wherein the memory stores a light intensity according to a distance between an image reading sensor and a position of each read pixel on the white reference plate.

7. The device according to claim 6,
wherein the memory stores a light intensity so that a light exposure amount at a position of each read pixel on the white reference plate becomes constant.

8. An image forming apparatus comprising:
an image reading sensor which converts light from an imaging position into image data;
a lighting unit in which an imaging position is irradiated with light;
a white reference plate which has a reading range which is a white reference value;
a controller which adjusts a light intensity of light which is emitted from the lighting unit, and sets a white reference value using a plurality of pixels of the white reference plate which are read using the image reading sensor, and causes an image on a face of the original document which passes through a predetermined reading position to be read using the image reading sensor;
a signal processing unit which performs image processing of image data of the original document which is read using the image reading sensor based on the white reference value;
an image forming unit which forms an image corresponding to the image data of the original document which was subjected to the image processing using the signal processing unit on a recording medium; and
a memory which stores each read pixel of the white reference plate and a light intensity in association with each other,
wherein the controller adjusts the light intensity based on information stored in the memory.

9. A method of setting a white reference value which is used when performing an image reading process, the method comprising:
reading a plurality of portions in a reading range of a white reference plate using an image reading sensor;
adjusting a light intensity of light which is emitted from a lighting unit, and
setting a white reference value using image data which is read from the plurality of portions in the reading range of the white reference plate using the image reading sensor; and
storing each read pixel of the white reference plate and a light intensity in association with each other,
wherein adjusting the light intensity is based on information stored.

* * * * *

UNITED STATES PATENT AND TRADEMARK OFFICE
CERTIFICATE OF CORRECTION

PATENT NO. : 9,998,627 B2
APPLICATION NO. : 15/619797
DATED : June 12, 2018
INVENTOR(S) : Koseki et al.

Page 1 of 1

It is certified that error appears in the above-identified patent and that said Letters Patent is hereby corrected as shown below:

On the Title Page

In the First Column, item (73), the first Assignee, is listed as:
KABUSHII KAISHA TOSHIBA, Tokyo (JP)

It should read:
KABUSHIKI KAISHA TOSHIBA, Tokyo (JP)

Signed and Sealed this
Sixth Day of August, 2019

Andrei Iancu
*Director of the United States Patent and Trademark Office*